US012675646B2

(12) United States Patent
Schmidt

(10) Patent No.: US 12,675,646 B2
(45) Date of Patent: Jul. 7, 2026

(54) OPTIMAL SUBWORD TOKENIZATION AND VOCABULARY CREATION

(71) Applicant: S&P Global Inc., New York, NY (US)

(72) Inventor: Craig William Schmidt, Wellesley, MA (US)

(73) Assignee: S&P Global Inc., New York, NY (US)

( * ) Notice: Subject to any disclaimer, the term of this patent is extended or adjusted under 35 U.S.C. 154(b) by 236 days.

(21) Appl. No.: 18/413,825

(22) Filed: Jan. 16, 2024

(65) Prior Publication Data

US 2025/0232132 A1      Jul. 17, 2025

(51) Int. Cl.
*G06F 40/40* (2020.01)
*G06F 40/284* (2020.01)

(52) U.S. Cl.
CPC ............ *G06F 40/40* (2020.01); *G06F 40/284* (2020.01)

(58) Field of Classification Search
CPC ................................ G06F 40/40; G06F 40/284
See application file for complete search history.

(56) References Cited

U.S. PATENT DOCUMENTS 11,763,083 B2 * 9/2023 Song ...................... G06F 40/40
704/9

OTHER PUBLICATIONS

Kudo, Taku. "Subword regularization: Improving neural network translation models with multiple subword candidates." arXiv preprint arXiv:1804.10959 (2018). (Year: 2018).*

* cited by examiner

*Primary Examiner* — Daniel C Washburn
*Assistant Examiner* — Penny L Caudle
(74) *Attorney, Agent, or Firm* — Yee & Associates, P.C.

(57) ABSTRACT

Subword tokenization is provided. The method comprises receiving a text document comprising n bytes and specifying a maximum token width of L bytes. An initial vocabulary of tokens is defined, wherein the tokens comprise a number of different n-grams of L or less bytes. The document is tokenized with the fewest number of tokens from the vocabulary according to a minimum total weight through a directed acyclic graph comprising nodes that represent intervals between the bytes in the document and edges that represent potential tokens from the vocabulary appearing in text of the document. Natural language processing is then performed on the text document according to the tokenization.

30 Claims, 8 Drawing Sheets

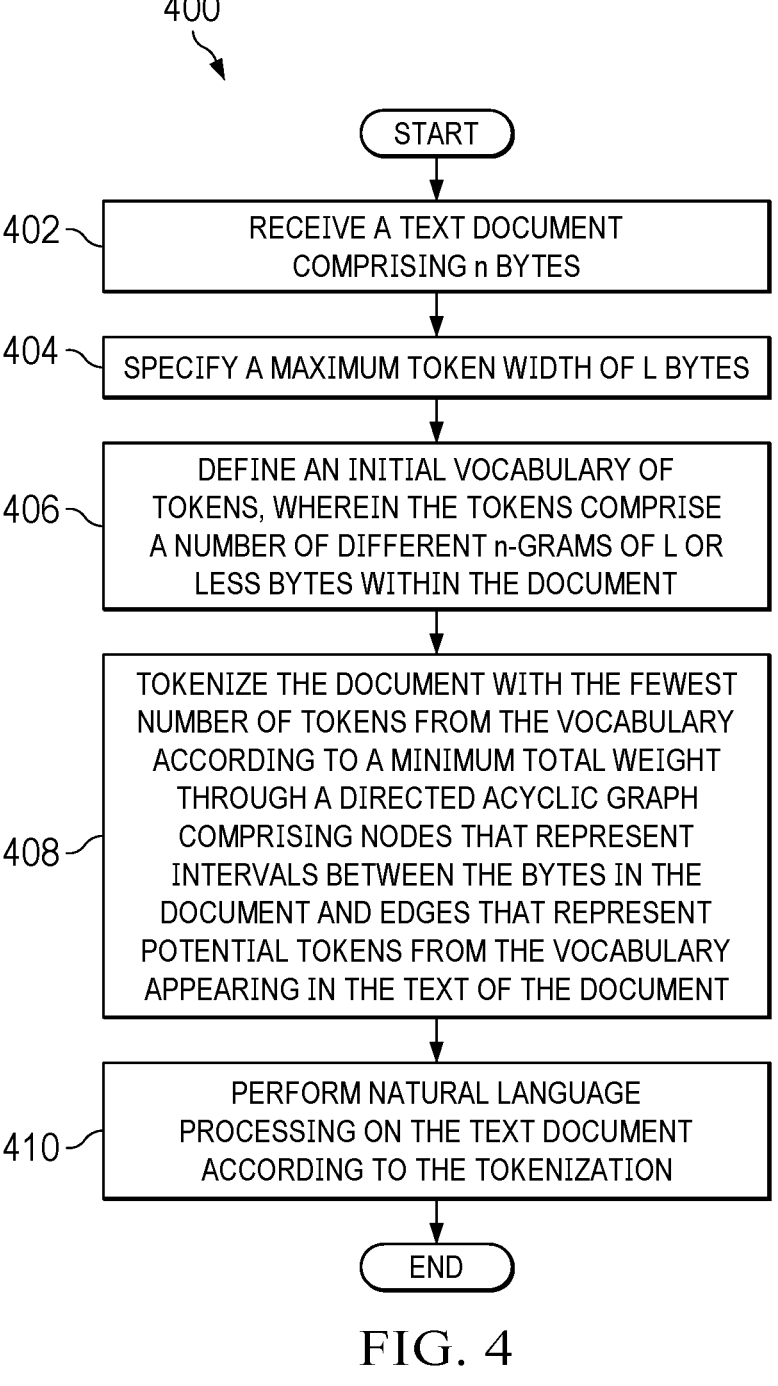

400

START

402 — RECEIVE A TEXT DOCUMENT COMPRISING n BYTES

404 — SPECIFY A MAXIMUM TOKEN WIDTH OF L BYTES

406 — DEFINE AN INITIAL VOCABULARY OF TOKENS, WHEREIN THE TOKENS COMPRISE A NUMBER OF DIFFERENT n-GRAMS OF L OR LESS BYTES WITHIN THE DOCUMENT

408 — TOKENIZE THE DOCUMENT WITH THE FEWEST NUMBER OF TOKENS FROM THE VOCABULARY ACCORDING TO A MINIMUM TOTAL WEIGHT THROUGH A DIRECTED ACYCLIC GRAPH COMPRISING NODES THAT REPRESENT INTERVALS BETWEEN THE BYTES IN THE DOCUMENT AND EDGES THAT REPRESENT POTENTIAL TOKENS FROM THE VOCABULARY APPEARING IN THE TEXT OF THE DOCUMENT

410 — PERFORM NATURAL LANGUAGE PROCESSING ON THE TEXT DOCUMENT ACCORDING TO THE TOKENIZATION

END

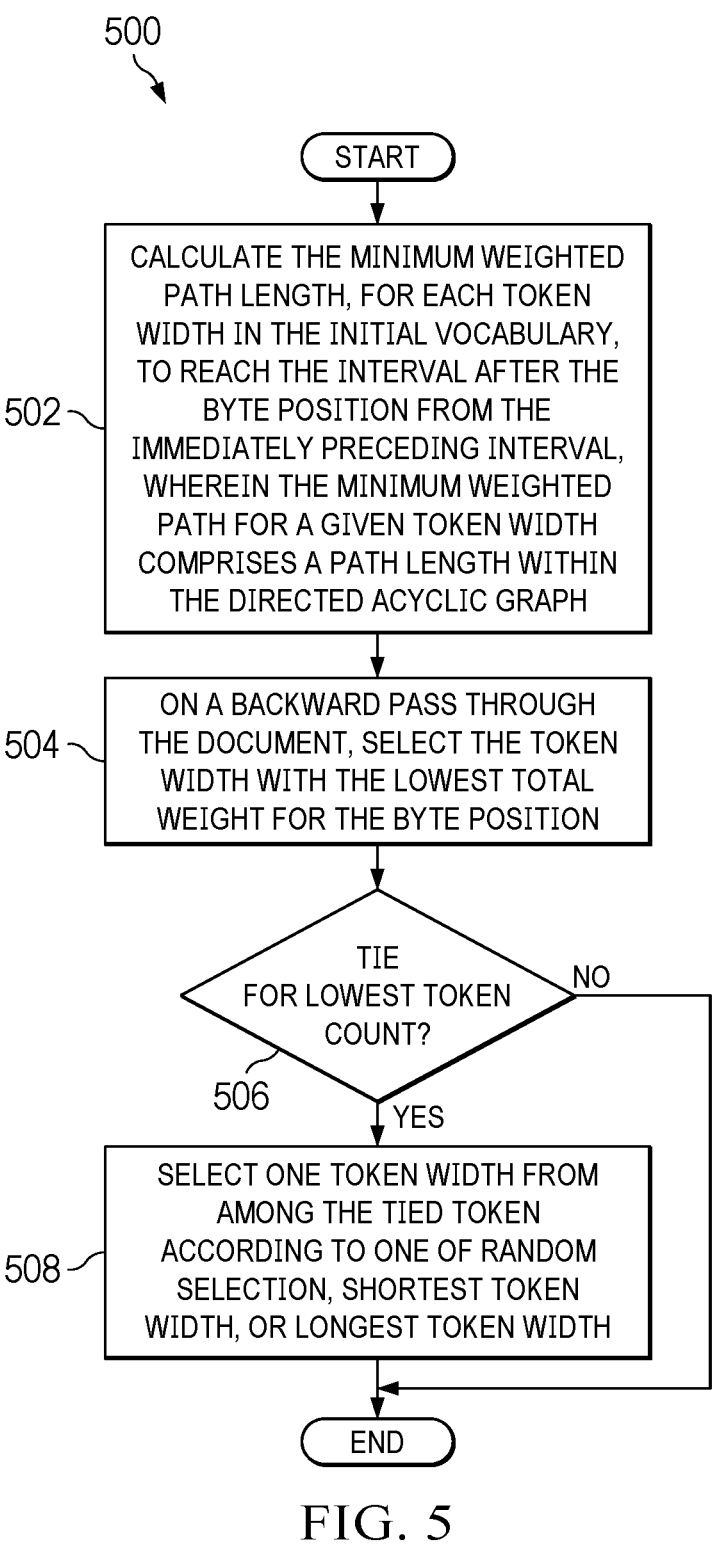

START

502 ~ CALCULATE THE MINIMUM WEIGHTED PATH LENGTH, FOR EACH TOKEN WIDTH IN THE INITIAL VOCABULARY, TO REACH THE INTERVAL AFTER THE BYTE POSITION FROM THE IMMEDIATELY PRECEDING INTERVAL, WHEREIN THE MINIMUM WEIGHTED PATH FOR A GIVEN TOKEN WIDTH COMPRISES A PATH LENGTH WITHIN THE DIRECTED ACYCLIC GRAPH

504 ~ ON A BACKWARD PASS THROUGH THE DOCUMENT, SELECT THE TOKEN WIDTH WITH THE LOWEST TOTAL WEIGHT FOR THE BYTE POSITION

TIE FOR LOWEST TOKEN COUNT?    NO

506

YES

508 ~ SELECT ONE TOKEN WIDTH FROM AMONG THE TIED TOKEN ACCORDING TO ONE OF RANDOM SELECTION, SHORTEST TOKEN WIDTH, OR LONGEST TOKEN WIDTH

END

FIG. 5

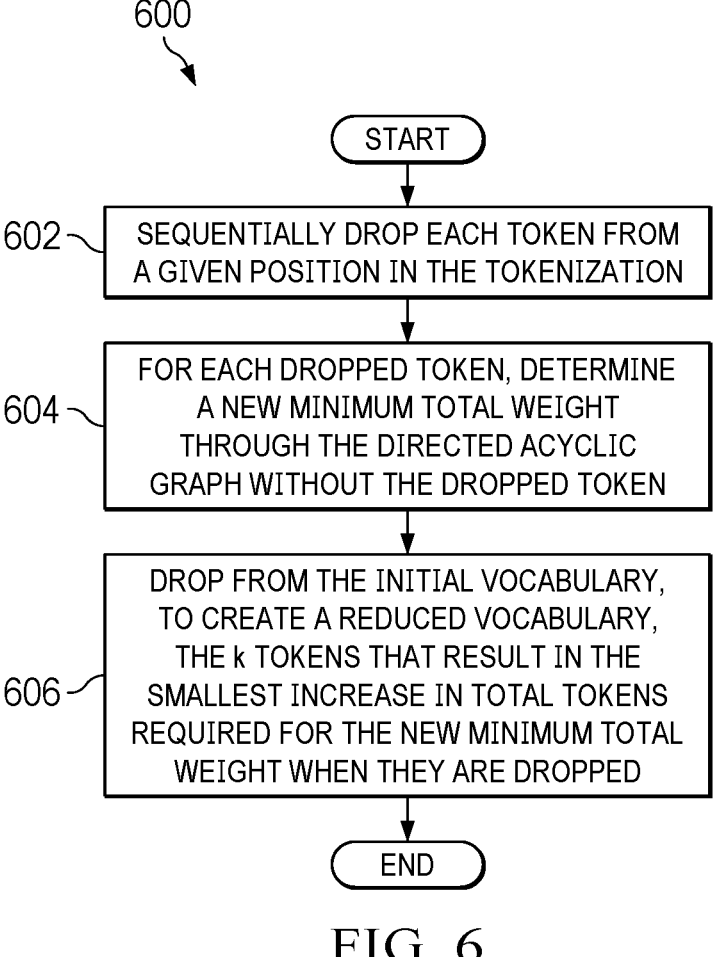

600

START

602 — SEQUENTIALLY DROP EACH TOKEN FROM A GIVEN POSITION IN THE TOKENIZATION

604 — FOR EACH DROPPED TOKEN, DETERMINE A NEW MINIMUM TOTAL WEIGHT THROUGH THE DIRECTED ACYCLIC GRAPH WITHOUT THE DROPPED TOKEN

606 — DROP FROM THE INITIAL VOCABULARY, TO CREATE A REDUCED VOCABULARY, THE k TOKENS THAT RESULT IN THE SMALLEST INCREASE IN TOTAL TOKENS REQUIRED FOR THE NEW MINIMUM TOTAL WEIGHT WHEN THEY ARE DROPPED

END

FIG. 6

OPTIMAL SUBWORD TOKENIZATION AND VOCABULARY CREATION

BACKGROUND INFORMATION

1. Field

The present disclosure relates generally to natural language processing, and more specifically to tokenizing text in preparation of natural language processing.

2. Background

Tokenization is the first step in a natural language processing (NLP) task. Tokenization takes text and breaks it into "tokens" which are represented by integers. These can be used by the NLP task, such as using it to train a language model.

Typically, each word is represented as a single token. However, this approach results in a very large vocabulary which can be expensive to represent in a language model. It also suffers from the "out of vocabulary" problem when encountering a new word that is not in the vocabulary.

SUMMARY

An illustrative embodiment provides a computer-implemented method for subword tokenization. The method comprises receiving a text document comprising n bytes and specifying a maximum token width of L bytes. An initial vocabulary of tokens is defined, wherein the tokens comprise a number of different n-grams of L or less bytes. The document is tokenized with the fewest number of tokens from the vocabulary according to a minimum total weight through a directed acyclic graph comprising nodes that represent intervals between the bytes in the document and edges that represent potential tokens from the vocabulary appearing in text of the document. Natural language processing is then performed on the text document according to the tokenization.

Another illustrative embodiment provides a system for subword tokenization. The system comprises a storage device that stores program instructions and one or more processors operably connected to the storage device and configured to execute the program instructions to cause the system to: receive a text document comprising n bytes; specify a maximum token width of L bytes; define an initial vocabulary of tokens, wherein the tokens comprise a number of different n-grams of L or less bytes; tokenize the document with the fewest number of tokens from the vocabulary according to a minimum total weight through a directed acyclic graph comprising nodes that represent intervals between the bytes in the document and edges that represent potential tokens from the vocabulary appearing in text of the document; and perform natural language processing on the text document according to the tokenization.

Another illustrative embodiment provides a computer program product for subword tokenization. The computer program product comprises a computer-readable storage medium having program instructions embodied thereon to perform the steps of: receiving a text document comprising n bytes; specifying a maximum token width of L bytes; defining an initial vocabulary of tokens, wherein the tokens comprise a number of different n-grams of L or less bytes; tokenizing the document with the fewest number of tokens from the vocabulary according to a minimum total weight through a directed acyclic graph comprising nodes that represent intervals between the bytes in the document and edges that represent potential tokens from the vocabulary appearing in text of the document; and performing natural language processing on the text document according to the tokenization.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 depicts a flowchart illustrating a process for subword tokenization in accordance with an illustrative embodiment;

FIG. 5 depicts a flowchart illustrating a process for determining the minimum total weight for tokenization in accordance with an illustrative embodiment;

FIG. 6 depicts a flowchart illustrating a process for reducing the initial vocabulary in accordance with an illustrative embodiment

DETAILED DESCRIPTION

The illustrative embodiments recognize and take into account that tokenization is the first step in a natural language processing (NLP) task. Tokenization takes text and breaks it into "tokens" which are represented by integers. These can be used by the NLP task, such as using it to train a language model. Typically, each word is represented as a single token. However, this approach results in a very large vocabulary which can be expensive to represent in a language model. It also suffers from the "out of vocabulary" problem when encountering a new word that is not in the vocabulary.

The illustrative embodiments also recognize and take into account that current tokenizers fall into two categories with separate issues. The first group are greedy and non-contextual but fast. They make local decisions such as merging two tokens together to make a new one that are not globally optimal. Therefore, they will end up using more tokens to tokenize the text than is necessary. They are also non-contextual meaning they do not take the other words or tokens around a given token into account when tokenizing, which can also lead to suboptimal decisions. However, they are very fast.

The other category of tokenizers is contextual but quadratic in speed.

The illustrative embodiments provide a contextual, non-greedy tokenizer that is linear in time. The illustrative embodiments utilize subword tokenization has common words as their own token but breaks others words down into subwords, analogous to syllables, such as "ing". The illustrative embodiments work at a byte level and make sure to include all 256 bytes. The combination of subwords (containing full words, partial words, or bytes), can tokenize any text, avoiding the out-of-vocabulary problem.

Given N bytes of data to tokenize and a token maximum length of L bytes long, the subword tokenizer runs in O(N*L). It is optimal (non-greedy) in the sense that it will return a tokenization of the text that uses the possible smallest number of tokens for a given vocabulary. If there are multiple shortest tokenizations, the subword tokenizer might return a random one of those.

With a given vocabulary V and tokenization of text, the subword tokenizer of the illustrative embodiments can also compute the minimum increase in tokens resulting from omitting a particular token from V and can do it in time $O(L^2N)$, still linear in the size of the data. This metric can be used to find an optimal vocabulary. Starting with a large initial vocabulary, either the most frequent n-grams of bytes with length less than L or a vocabulary from another tokenizer, are used to tokenize with the subword tokenizer. Then the minimum increase in tokens for omitting each token is computed. The k tokens that result in the smallest increase are omitted from V. This reduction procedure can be repeated until the vocabulary has the desired size, created in a way that should minimize the tokens required to tokenize a text.

Figure 1:
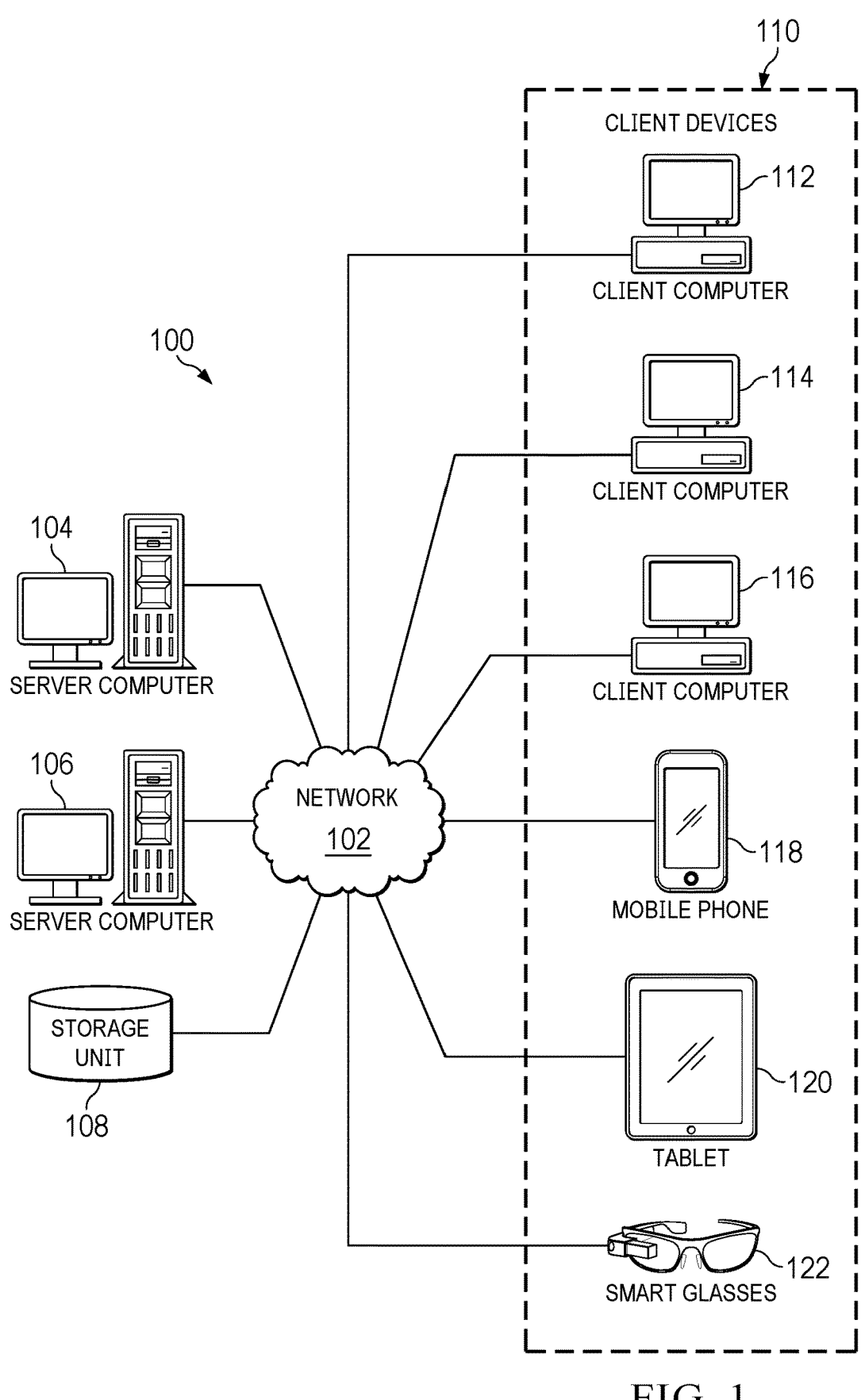
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
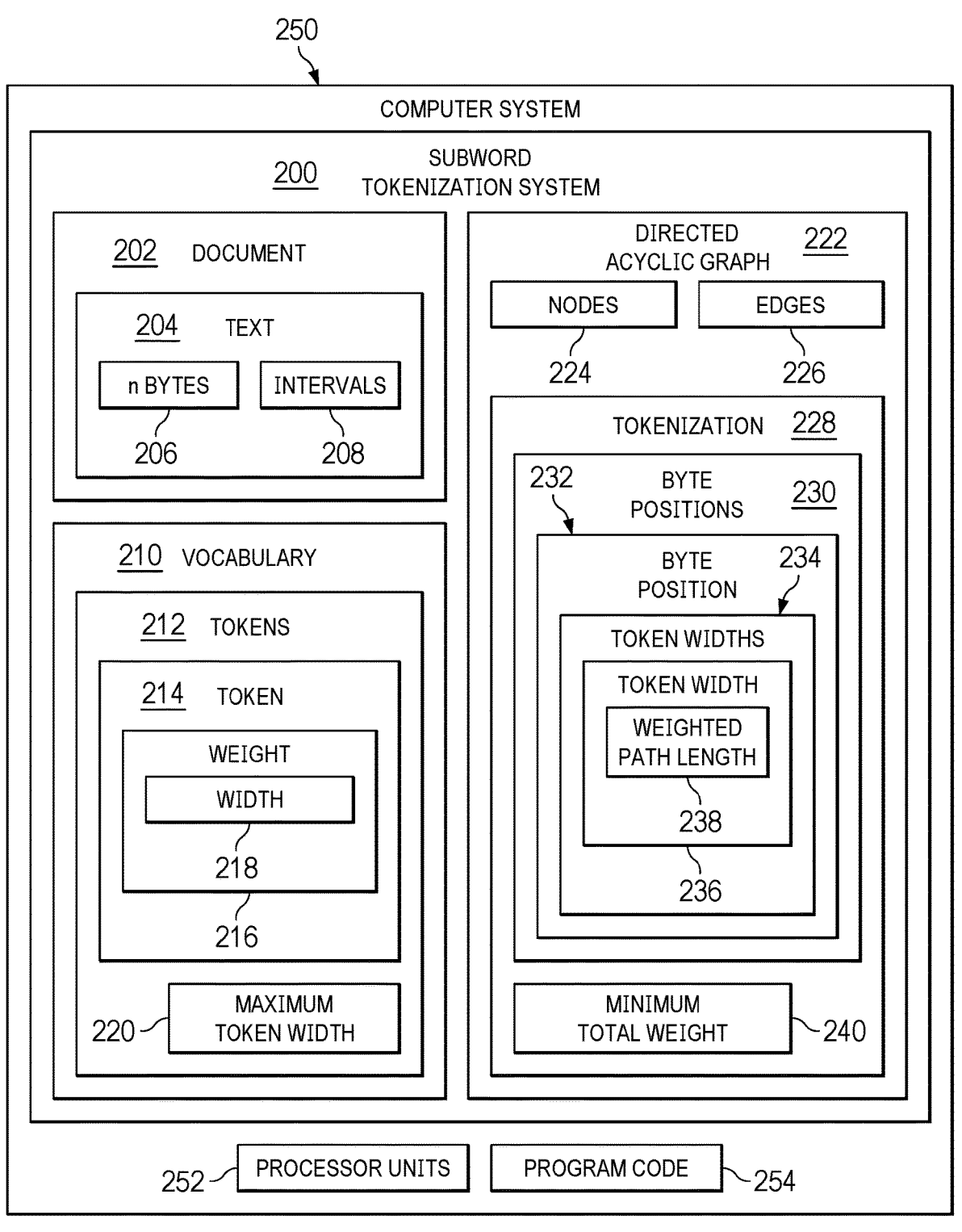
FIG. 2 is a block diagram of a subword tokenization system depicted in accordance with an illustrative embodiment.

FIG. 2 is a block diagram of a subword tokenization system depicted in accordance with an illustrative embodiment. Subword tokenization system 200 might be implemented in network data processing system 100 in FIG. 1.

Subword tokenization system 200 performs a tokenization 226 of a document 202. Document 202 comprises text 204, which includes n bytes 206 and intervals 208 between the bytes.

To perform the tokenization 228, subword tokenization system 200 utilizes a vocabulary 210 comprising a number of tokens 212. Each token 214 among tokens 212 has an associated weight 216. This weight might comprise a width 218 of the token 214, which is the number of bytes in the token. For example, a token might have a width of one byte, two bytes, three bytes, etc. (see FIG. 3). Vocabulary 210 might have specific a maximum token width 220 of L bytes, where L might be, for example, 8, 12, 16, etc.

Tokenization 228 is performed according to a directed acyclic graph (DAG) 222. DAG 222 comprises a number of nodes 224 and edges 226. The nodes 224 represent the intervals 208 between the bytes 206 in the text 204. The edges 226 represent potential tokens 212 from the vocabulary 210 that are present in the text 204 of document 202.

Tokenization 228 proceeds along the byte positions 230 within document 202. At each byte position 232 subword tokenization system 200 examines the differ token widths 234 from the vocabulary 210 that are available at that byte position. For each token width 236, subword tokenization system 200 determines the total weight to reach the interval after the byte position 232 in question from the immediately preceding interval in document 202 (see FIG. 3). This total weight is comprised of the weight 216 of the token, plus the minimum weight to reach the interval immediately preceding the token, which is referred to as the weighted path length 238 for that token width 236 in the DAG 222.

Tokenization 228 of document 202 is made according to a minimum total weight 240 through the DAG 222. This minimum total weight 240 is the sum of the token weights. Expressed in terms of token width 236, the minimum total 240 is the shortest weighted path through the DAG 222.

Subword tokenization system 200 can be implemented in software, hardware, firmware, or a combination thereof. When software is used, the operations performed by subword tokenization system 200 can be implemented in program code configured to run on hardware, such as a processor unit. When firmware is used, the operations performed by subword tokenization system 200 can be implemented in program code and data and stored in persistent memory to run on a processor unit. When hardware is employed, the hardware can include circuits that operate to perform the operations in subword tokenization system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein, a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
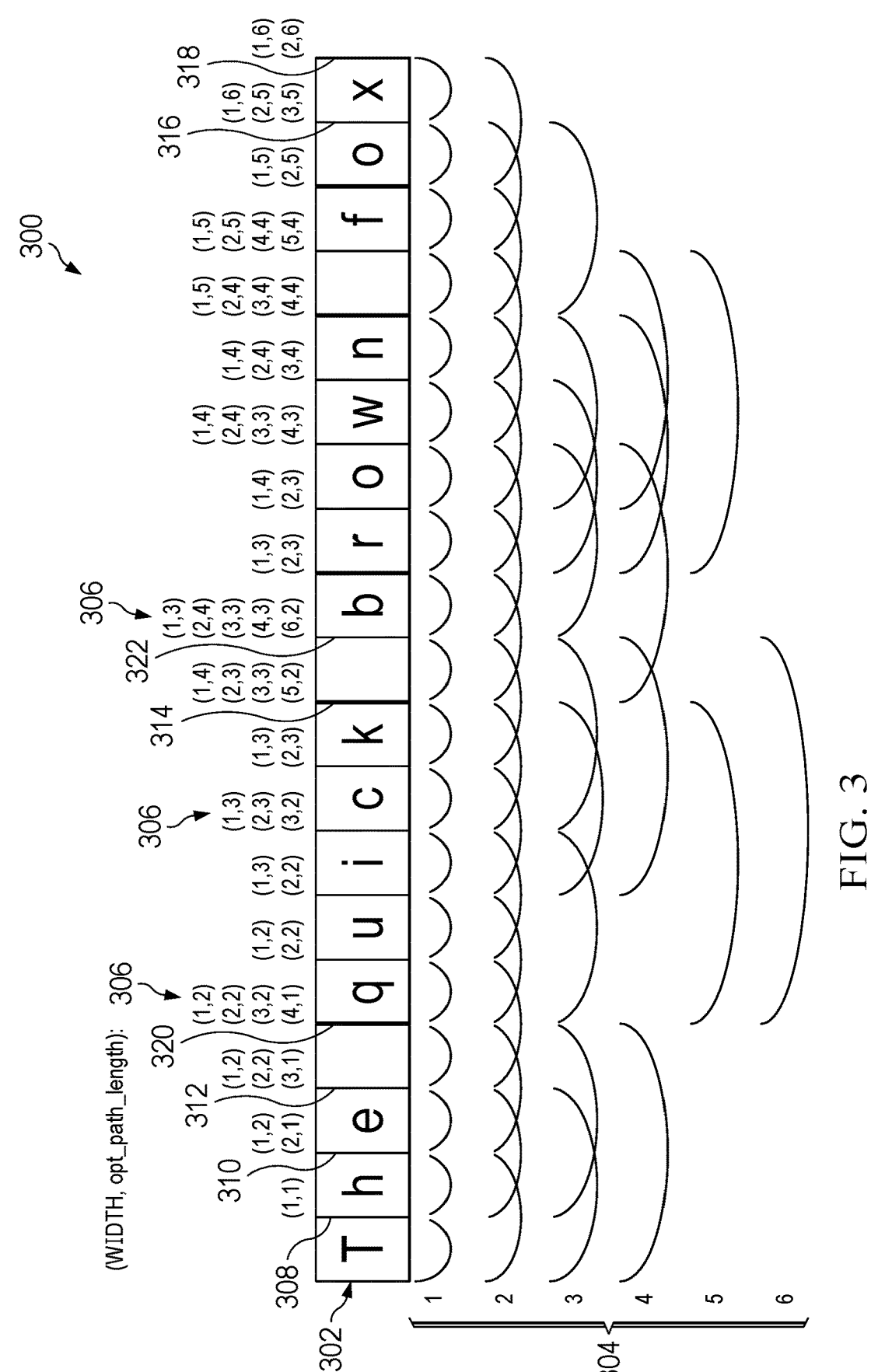
FIG. 3 depicts a directed acyclic graph for tokenization in accordance with an illustrative embodiment.

FIG. 3 depicts a directed acyclic graph for tokenization in accordance with an illustrative embodiment. DAG 300 is an example of DAG 222 in FIG. 2. In this example all weights are taken to be 1.

DAG 300 comprises document 302, which contains the text "The quick brown fox." Below the document 302 is a vocabulary 304 defining tokens of varying widths. In the present example, the tokens in vocabulary 304 vary in width from one byte up to a maximum of six bytes.

Between each byte position in document 302 is a line indicating an interval between bytes. These lines are nodes in DAG 300. The arcs shown in vocabulary 304 below document 302 are the edges of DAG 300 that connect the nodes. Above the nodes are respective tokenizations 306. Each tokenization 306 comprises two numbers. The first number represents a token width, and the second number represents the weighted path length needed if that token width is used to reach the node in question from the interval immediately preceding the token in document 302.

The number of tokenizations above each node depends on the token widths available at the node position within vocabulary 304. As can be seen in FIG. 3, not all token widths are available at every node in document 302.

For example, at node 308 after the T in "The" there is one tokenization, (1, 1). At this position in the document 302 there is only one token width available in vocabulary 304, 1-byte. The weighted path length to reach node 308 from the beginning of document 302 with this token width is also 1.

At node 310 after the "h" in "The" there are two tokenizations, (1,2) and (2,1). At this position in the document there are two token widths available in vocabulary 304, 1-byte and 2-byte. For the 1-byte token width, the weighted path length to reach node 310 from node 308 is 2. This weighted path length is calculated by adding the weight of the token (1 in this example) to the previous weighted path length to reach the immediately preceding node (node 308). For the 2-byte width, the weighted path length to reach node 310 is 1 because there is only one 2-byte token in vocabulary 304 between the beginning of document 302 and node 310.

At node 312 there are three token widths available in vocabulary 304, 1-byte, 2-byte, and 3-byte. Therefore, there are three tokenizations shown above node 312: (1,2), (2,2), and (3,1). For the 1-byte token width, the weighted path length to reach node 312 is 2, which is calculated by adding 1 to the minimum of the previous weighted path lengths to reach node 310. Looking back at node 310, the tokenizations are (1, 2) and (2,1). Therefore, the minimum (optimal) of the two path lengths (the second number in each tokenization) is 1. Therefore, the weighted path length for the 1-byte token width is 2. Similarly, the weighted path length for the 2-byte token width is also 2 because, again, 1 is added to the minimum of the previous path lengths needed to arrive at the previous node (node 310).

In the case of the 3-byte token width at node 312, the path length is 1 because there is one 3-byte token in vocabulary 304 between the beginning of document 302 and node 312.

This process is continued to the (right) end of the document 302, after which a backward pass is made to find the tokenization at each byte position that has the lowest token count (shortest weighted path length). The backward pass begins at node 318 at the end of document 302 and proceed leftward toward the beginning. At each node, subword tokenization system 200 compares the weighted path lengths for the tokenizations (the second number in each parentheses) and selects the lowest weighted path length for that node. However, as can be seen in the example in FIG. 3, there are several nodes that have multiple tokenizations with equal weighted path lengths. In the case of a tie, the subword tokenization system 200 might select between the tied tokenizations randomly or according to the longest or shortest token width.

For example, starting at end node 318 there are two tokenizations with the same weighted path length: (1, 6) and (2,6). In the case of such a tie, the subword tokenization system 200 might select between the two tokenizations randomly. Alternatively, it might select the tokenization with the short token width (1, 6) or the one with the longer token width (2, 6).

As another example, at node 316 there are three tokenizations: (1,6), (2,5), and (3,5). In this example, tokenization (1,6) is eliminated because it has the longest weighted path length, leaving a tie between (2,5) and (3,5). Again, subword tokenization system 200 might select between (2,5) and (3,5) randomly or according to token width.

As a simpler example, at node 314, there are four tokenizations: (1,4), (2,3), (3,3), and (5,2). At this node, tokenization (5,2) would be selected because it has the shortest weighted path length.

This backward pass procedure is continued through the nodes to the start of document 302. In FIG. 3, if ties between weighted path lengths are broken using the widest token, then the tokens selected by the backward pass are shown in bold vertical lines. Therefore, in the present example, the selected tokens are "The", "quick", "b", "rown", "f", and "ox".

The vocabulary of tokens can also be pared down by sequentially dropping each token from a given position in the tokenization of the document and determining the number of tokens required to tokenize the document without that token. The removal of each token will result in a potential increase in the number of tokens necessary to tokenize the document. (It may also stay the same.) However, this increase will not be the same for all tokens. The more important a token is to the vocabulary, the greater the increase in the number of other tokens needed to make up for its absence when tokenizing the document. The tokens whose removal result in the smallest increases in the number of tokens required for tokenization are the least valuable and can be dropped from the vocabulary.

FIG. 4 depicts a flowchart illustrating a process for subword tokenization in accordance with an illustrative embodiment. Process 400 can be implemented in subword tokenization system 200 in FIG. 2.

Process 400 begins by receiving a text document comprising n bytes (step 402). Process 400 specifies a maximum token width of L bytes for tokens that can be used to tokenize the document (step 404).

Process 400 defines an initial vocabulary of tokens, wherein the tokens comprise a number of different n-grams of L or less bytes within the document (step 406). This initial vocabulary might be compiled from one of the M most common n-grams found in a text training corpus, or a vocabulary generated by another tokenizer.

Process 400 then tokenizes the document with the fewest number of tokens from the vocabulary according to a minimum total weight through a directed acyclic graph (DAG) (step 408). The DAG comprises nodes that represent intervals between the bytes in the document and edges that represent potential tokens from the vocabulary appearing in the text of the document. A token weight is any positive value, and the minimum total weight is the sum of token weights (total weighted path length through the DAG). In an unweighted case the token weights are all 1, in which case the minimum total weight represents the number of tokens in a path through the DAG.

Process 400 performs natural language processing on the text document according to the tokenization (step 410). Process 400 then ends.

FIG. 5 depicts a flowchart illustrating a process for determining the minimum total weight for tokenization in accordance with an illustrative embodiment. Process 500 is a detailed example of step 408 in FIG. 4.

For each byte position in the document process 500 calculates the minimum weighted path length, for each token width in the initial vocabulary, to reach the interval after the byte position from the immediately preceding interval (step 502). The weighted path length for a given token width comprises a path length within the directed acyclic graph. This calculation comprises adding the weight of the token to the minimum of previous weighted path lengths to reach the immediately preceding node.

After calculating the minimum weighted path length for each token width, process 500 performs a backward pass through the document and selects the token width with the lowest total weight for the byte position (step 504).

Process 500 determines whether there is a tie among token widths for the lowest minimum weighted path length (step 506). Responsive to a determination that multiple token widths are tied for the lowest minimum weighted path length, process 500 selects one token width from among the tied token according to one of random selection, shortest token width, or longest token width (step 508). Process 500 then ends.

FIG. 6 depicts a flowchart illustrating a process for reducing the initial vocabulary in accordance with an illustrative embodiment. Process 600 can be performed between step 408 and step 410 in FIG. 4 to reduce the vocabulary used for the natural language processing.

Process 600 begins by sequentially dropping each token from a given position in the tokenization (step 602). A token from the tokenization is not dropped if a superset or subset of that token has previously been dropped.

For each dropped token, process 600 determines a new minimum total weight through the directed acyclic graph without the dropped token (step 604).

To create a reduced vocabulary, process 600 drops from the initial vocabulary the k tokens that result in the smallest increase in total tokens required for the new minimum total weight when they are dropped (step 606). The reduced vocabulary contains all single-byte tokens from the initial vocabulary. Maintaining the single-byte tokens allows the tokenizer to tokenize any arbitrary text, as it will always be able to be tokenized as a series of single byte tokens. Process 600 then ends.

Figure 7:
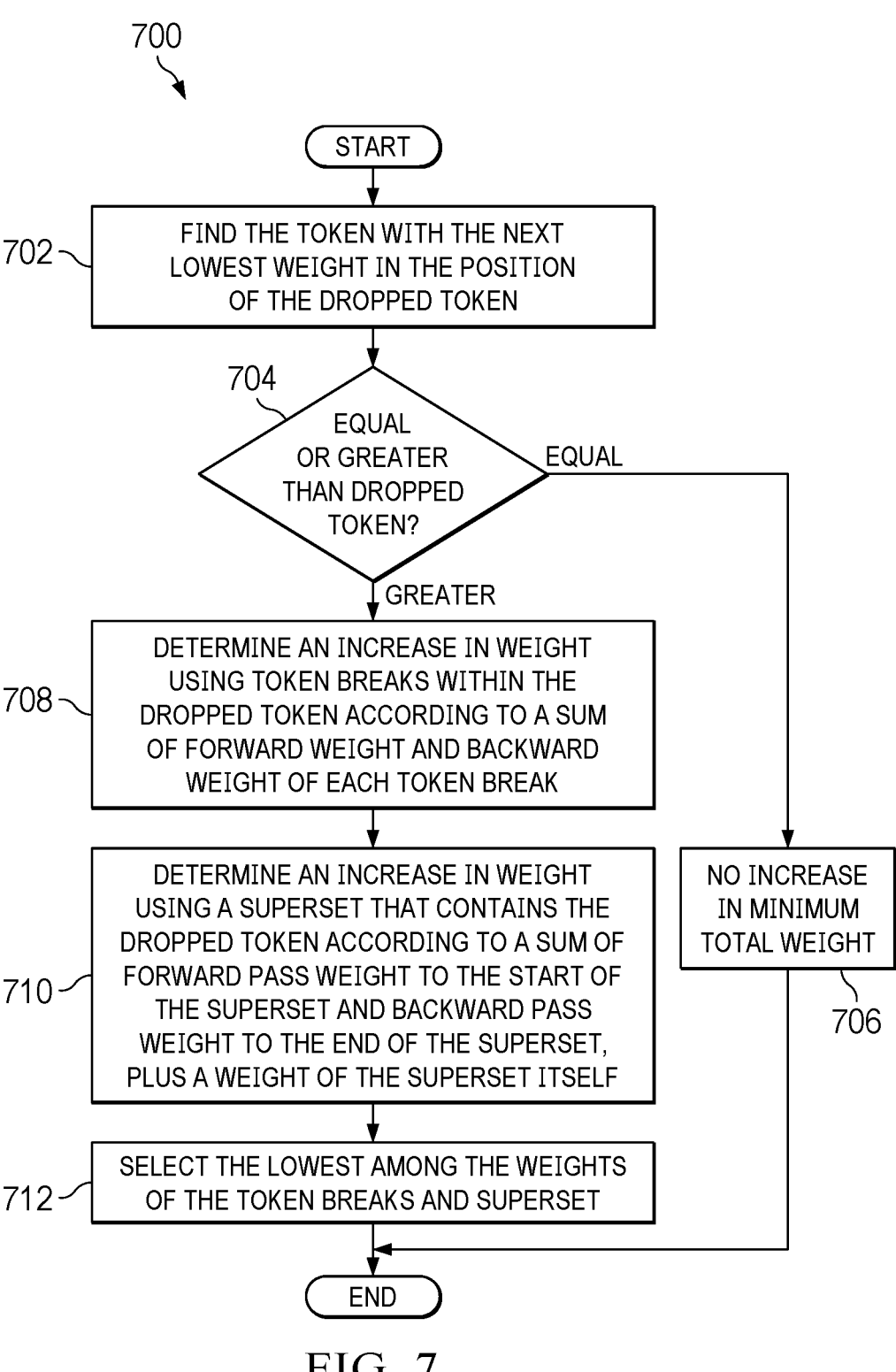
FIG. 7 depicts a flowchart illustrating a process for determining a new minimum total weight through the directed acyclic graph without a dropped token in accordance with an illustrative embodiment.

FIG. 7 depicts a flowchart illustrating a process for determining a new minimum total weight through the directed acyclic graph without a dropped token in accordance with an illustrative embodiment. Process 700 is a detailed example of step 604 in FIG. 6.

Process 700 begins by finding the token with the next lowest weight in the position of the dropped token (step 702) then determining whether that next lowest is equal to or greater than the weight of the dropped token (step 704). It must be kept in mind that the initial tokenization of the document was performed according to the minimum total weight through the DAG. Therefore, the next lowest weight at any position can never be lower than that of the dropped token, only equal to or greater.

Responsive to a determination that the next lowest weight has the same weight as the dropped token (e.g., node 316 on FIG. 3), there is no increase in the minimum total weight as a result of the dropped token at that position (step 706).

If the token with the next lowest weight has a higher weight than the dropped token, the shortest path through the DAG without the dropped token must either have a token boundary within the word, which breaks the token into parts (e.g., the nodes separating the letters in "quick" in FIG. 3), or the path contains a longer token that is a superset (parent token) of the dropped token (e.g., the word "quick" plus the space after it).

Therefore, responsive to a determination that the next lowest weight has a greater weight than the dropped token, process 700 determines the increase in weight from using the token breaks within the dropped token (step 708). This step can be accomplished by finding the backward pass weight from the end of the document (e.g., node 318 in FIG. 3) to each token break. This backward pass weight is added to the forward pass weight of that token break from the start of the document, which was previously determined as part of tokenization step 408 in process 400 using the procedure explain above.

Process 700 also determines the increase in weight of using the superset (parent token) that includes the dropped token (step 710). The lowest weight containing the superset is the sum of the forward pass weight from the start of the document to the start of the superset and the backward pass weight from the end of the document to the end of the superset, plus the weight of the superset itself. For example, in FIG. 3, if the superset comprises "quick" plus the following space, the forward pass weight would be determined from the start of document 302 to node 320. The backward pass weight would be determined from node 318 to node 322. Then the weight of "quick" plus the following space would be added to the sum of the forward and backward pass weights.

Process 700 selects the lowest among the weights determined for the token breaks and superset in steps 708 and 710 to determine the new minimum total weight through the directed acyclic graph without the dropped token (step 712). Process 700 then ends.

Figure 8:
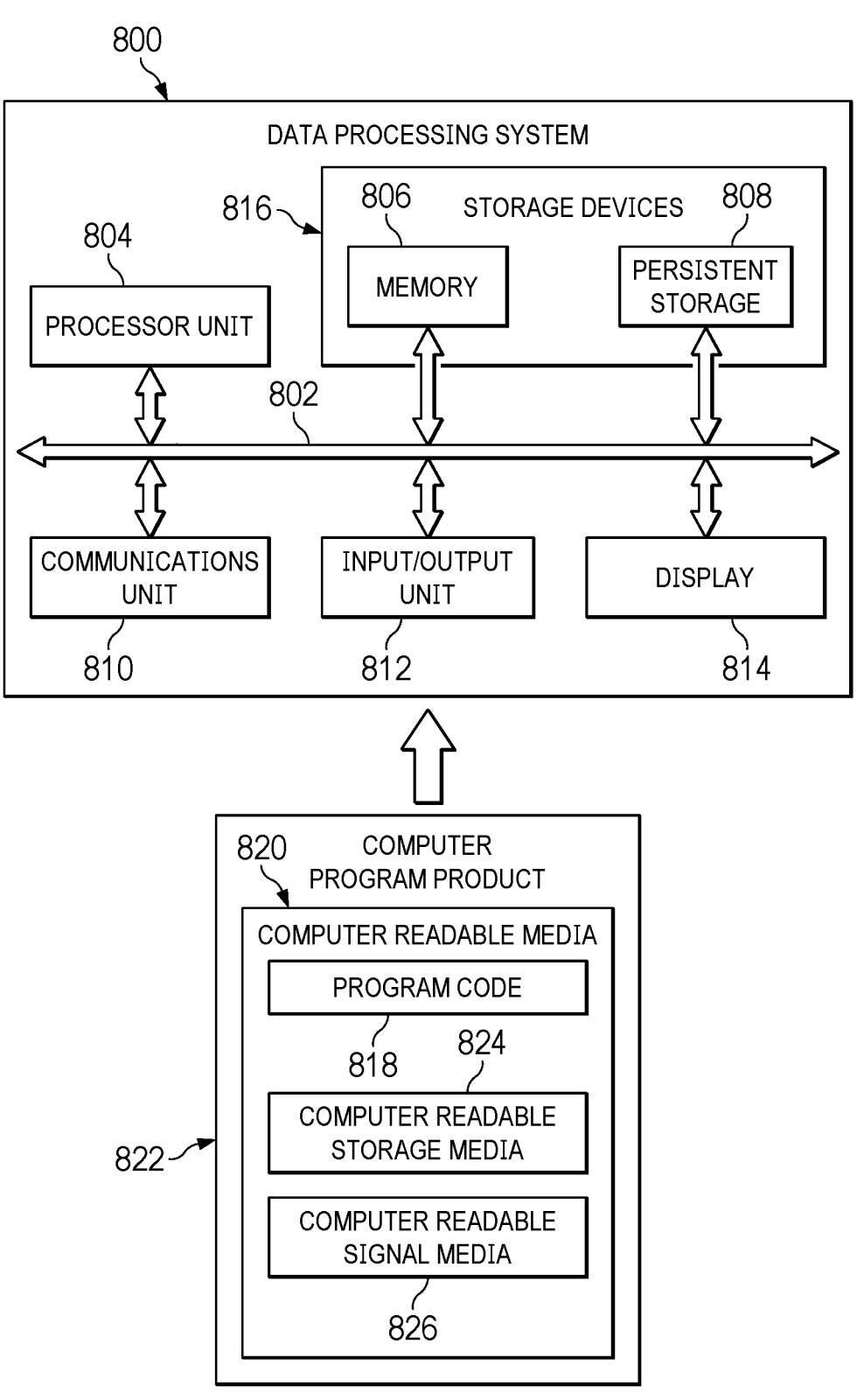
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computer 104 and server computer 106 and client devices 110 in FIG. 1, as well as computer system 260 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (GPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device.

Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for subword tokenization, the method comprising:

using a number of processors to perform:

receiving a text document comprising n bytes;

specifying a maximum token width of L bytes;

defining an initial vocabulary of tokens, wherein the tokens comprise a number of different n-grams of L or less bytes;

tokenizing the document with the fewest number of tokens from the vocabulary according to a minimum total weight through a directed acyclic graph comprising nodes that represent intervals between the bytes in the document and edges that represent potential tokens from the vocabulary appearing in text of the document; and training a language model according to the tokenization.

2. The method of claim 1, wherein a token weight is a constant value of 1, and wherein the minimum total weight represents the number of tokens in a path through the directed acyclic graph.

3. The method of claim 1, further comprising:

sequentially dropping each token from a given position in the tokenization;

for each dropped token, determining a new minimum total weight through the directed acyclic graph without the dropped token; and dropping from the initial vocabulary, to create a reduced vocabulary, the k tokens that result in the smallest increase in total tokens required for the new minimum total weight when they are dropped.

4. The method of claim 3, wherein determining a new minimum total weight through the directed acyclic graph without the dropped token comprises:

finding the token with the next lowest weight in the position of the dropped token;

responsive to a determination that the next lowest weight has the same weight as the dropped token, there is no increase in the minimum total weight;

responsive to a determination that the next lowest weight has a greater weight than the dropped token:

determining an increase in weight using token breaks within the dropped token according to a sum of forward weight and backward weight of each token break;

determining an increase in weight using a superset that contains the dropped token according to a sum of forward pass weight to the start of the superset and backward pass weight to the end of the superset, plus a weight of the superset itself; and selecting the lowest among the weights of the token breaks and superset.

5. The method of claim 3, wherein the reduced vocabulary contains all single-byte tokens from the initial vocabulary.

6. The method of claim 3, wherein a token from the tokenization is not dropped if a superset or subset of that token has previously been dropped.

7. The method of claim 1, wherein the initial vocabulary is compiled from one of:

M most common n-grams contained in a training corpus of text; or a vocabulary generated by another tokenizer.

8. The method of claim 1, wherein determining the minimum total weight comprises, for each byte position in the document:

calculating a minimum weighted path length, for each token width in the initial vocabulary, to reach the interval after the byte position from the immediately preceding interval, wherein the minimum weighted path length for a given token width comprises a path length within the directed acyclic graph; and on a backward pass through the document, selecting the token width with the lowest total weight for the byte position.

9. The method of claim 8, wherein calculating the minimum weighted path length, for each token width in the vocabulary, to reach the interval after the byte position from the immediately preceding interval comprises adding the weight of the token to the minimum of previous path lengths to reach the immediately preceding node.

10. The method of claim 8, wherein, responsive to a determination that multiple token widths are tied for the lowest minimum weighted path length, selecting one token width from among the tied token according to one of:

random selection;

shortest token width; or longest token width.

11. A system for subword tokenization, the system comprising:

a storage device that stores program instructions;

one or more processors operably connected to the storage device and configured to execute the program instructions to cause the system to:

receive a text document comprising n bytes;

specify a maximum token width of L bytes;

define an initial vocabulary of tokens, wherein the tokens comprise a number of different n-grams of L or less bytes;

tokenize the document with the fewest number of tokens from the vocabulary according to a minimum total weight through a directed acyclic graph comprising nodes that represent intervals between the bytes in the document and edges that represent potential tokens from the vocabulary appearing in text of the document; and train a language model according to the tokenization.

12. The system of claim 11, wherein a token weight is a constant value of 1, and wherein the minimum total weight represents the number of tokens in a path through the directed acyclic graph.

13. The system of claim 11, wherein the processors further execute instruction to:

sequentially drop each token from a given position in the tokenization;

for each dropped token, determine a new minimum total weight through the directed acyclic graph without the dropped token; and drop from the initial vocabulary, to create a reduced vocabulary, the k tokens that result in the smallest increase in total tokens required for the new minimum total weight when they are dropped.

14. The system of claim 13, wherein determining a new minimum total weight through the directed acyclic graph without the dropped token comprises:

finding the token with the next lowest weight in the position of the dropped token;

responsive to a determination that the next lowest weight has the same weight as the dropped token, there is no increase in the minimum total weight;

responsive to a determination that the next lowest weight has a greater weight than the dropped token:

determining an increase in weight using token breaks within the dropped token according to a sum of forward weight and backward weight of each token break;

determining an increase in weight using a superset that contains the dropped token according to a sum of forward pass weight to the start of the superset and backward pass weight to the end of the superset, plus a weight of the superset itself; and selecting the lowest among the weights of the token breaks and superset.

15. The system of claim 13, wherein the reduced vocabulary contains all single-byte tokens from the initial vocabulary.

16. The system of claim 13, wherein a token from the tokenization is not dropped if a superset or subset of that token has previously been dropped.

17. The system of claim 11, wherein the initial vocabulary is compiled from one of:

M most common n-grams contained in a training corpus of text; or a vocabulary generated by another tokenizer.

18. The system of claim 11, wherein determining the minimum total weight comprises, for each byte position in the document:

calculating a minimum weighted path length, for each token width in the initial vocabulary, to reach the interval after the byte position from the immediately preceding interval, wherein the minimum weighted path length for a given token width comprises a path length within the directed acyclic graph; and on a backward pass through the document, selecting the token width with the lowest total weight for the byte position.

19. The system of claim 18, wherein calculating the minimum weighted path length, for each token width in the vocabulary, to reach the interval after the byte position from the immediately preceding interval comprises adding the weight of the token to the minimum of previous path lengths to reach the immediately preceding node.

20. The system of claim 18, wherein, responsive to a determination that multiple token widths are tied for the lowest minimum weighted path length, selecting one token width from among the tied token according to one of:

random selection;

shortest token width; or longest token width.

21. A computer program product for subword tokenization, the computer program product comprising:

a computer-readable storage medium having program instructions embodied thereon to perform the steps of:

receiving a text document comprising n bytes;

specifying a maximum token width of L bytes;

defining an initial vocabulary of tokens, wherein the tokens comprise a number of different n-grams of L or less bytes;

tokenizing the document with the fewest number of tokens from the vocabulary according to a minimum total weight through a directed acyclic graph comprising nodes that represent intervals between the bytes in the document and edges that represent potential tokens from the vocabulary appearing in text of the document; and training a language model according to the tokenization.

22. The computer program product of claim 21, wherein a token weight is a constant value of 1, and wherein the minimum total weight represents the number of tokens in a path through the directed acyclic graph.

23. The computer program product of claim 21, further comprising instructions for:

sequentially dropping each token from a given position in the tokenization;

for each dropped token, determining a new minimum total weight through the directed acyclic graph without the dropped token; and dropping from the initial vocabulary, to create a reduced vocabulary, the k tokens that result in the smallest increase in total tokens required for the new minimum total weight when they are dropped.

24. The computer program product of claim 23, wherein determining a new minimum total weight through the directed acyclic graph without the dropped token comprises:

finding the token with the next lowest weight in the position of the dropped token;

responsive to a determination that the next lowest weight has the same weight as the dropped token, there is no increase in the minimum total weight;

responsive to a determination that the next lowest weight has a greater weight than the dropped token:

determining an increase in weight using token breaks within the dropped token according to a sum of forward weight and backward weight of each token break;

determining an increase in weight using a superset that contains the dropped token according to a sum of forward pass weight to the start of the superset and backward pass weight to the end of the superset, plus a weight of the superset itself; and selecting the lowest among the weights of the token breaks and superset.

25. The computer program product of claim 23, wherein the reduced vocabulary contains all single-byte tokens from the initial vocabulary.

26. The computer program product of claim 23, wherein a token from the tokenization is not dropped if a superset or subset of that token has previously been dropped.

27. The computer program product of claim 21, wherein the initial vocabulary is compiled from one of:

M most common n-grams contained in a training corpus of text; or a vocabulary generated by another tokenizer.

28. The computer program product of claim 21, wherein determining the minimum total weight comprises, for each byte position in the document:

calculating a minimum weighted path length, for each token width in the initial vocabulary, to reach the interval after the byte position from the immediately preceding interval, wherein the minimum weighted path length for a given token width comprises a path length within the directed acyclic graph; and on a backward pass through the document, selecting the token width with the lowest total weight for the byte position.

29. The computer program product of claim 28, wherein calculating the minimum weighted path length, for each token width in the vocabulary, to reach the interval after the byte position from the immediately preceding interval comprises adding the weight of the token to the minimum of previous path lengths to reach the immediately preceding node.

30. The computer program product of claim 28, wherein, responsive to a determination that multiple token widths are tied for the lowest minimum weighted path length, selecting one token width from among the tied token according to one of:

random selection;

shortest token width; or longest token width.

*   *   *   *   *